(12) United States Patent
Presna

(10) Patent No.: US 11,651,683 B1
(45) Date of Patent: May 16, 2023

(54) VEHICLE TO VEHICLE COMMUNICATION

(71) Applicant: Pierre-Richard Presna, Bridgeport, CT (US)

(72) Inventor: Pierre-Richard Presna, Bridgeport, CT (US)

(*) Notice: Subject to any disclaimer, the term of this patent is extended or adjusted under 35 U.S.C. 154(b) by 3 days.

(21) Appl. No.: 17/241,249

(22) Filed: Apr. 27, 2021

(51) Int. Cl.
| | |
|---|---|
| G08G 1/087 | (2006.01) |
| H04W 4/90 | (2018.01) |
| H04W 4/12 | (2009.01) |
| H04W 4/06 | (2009.01) |
| H04W 4/40 | (2018.01) |

(52) U.S. Cl.
CPC ............ *G08G 1/087* (2013.01); *H04W 4/06* (2013.01); *H04W 4/12* (2013.01); *H04W 4/40* (2018.02); *H04W 4/90* (2018.02)

(58) Field of Classification Search
CPC ............ G08G 1/00; G08G 1/087; G08G 1/09; G08G 1/095; G08G 1/0962; G08G 1/0965; G08G 1/0967; G08G 1/097; G08G 1/16; G08G 21/02; G08B 21/00; G08B 21/18; B60Q 1/00; H04W 4/00; H04W 4/04; H04W 4/06

See application file for complete search history.

(56) References Cited

U.S. PATENT DOCUMENTS

| | | | |
|---|---|---|---|
| 2011/0187559 A1* | 8/2011 | Applebaum | G08B 21/00 340/540 |
| 2017/0352268 A1* | 12/2017 | Colella | G08G 1/0965 |
| 2020/0098253 A1* | 3/2020 | Zeplin | G08G 1/081 |
| 2020/0152058 A1* | 5/2020 | Edwards | G08G 1/093 |
| 2021/0212158 A1* | 7/2021 | Robertson, II | H04W 76/50 |
| 2021/0248905 A1* | 8/2021 | Edwardson | H04W 4/44 |

OTHER PUBLICATIONS

NPL Search.*

* cited by examiner

*Primary Examiner* — Van T Trieu

(57) ABSTRACT

The vehicle to vehicle communication system is a traffic control system. The vehicle to vehicle communication system integrates the operation of an emergency vehicle with civilian traffic operating on a road network. The vehicle to vehicle communication system incorporates an appropriate authority, a commercially provided and publicly available cellular wireless network, the emergency vehicle, and the civilian traffic. The appropriate authority is defined elsewhere in this disclosure. The appropriate authority exchanges messages with the emergency vehicle using the commercially provided and publicly available cellular wireless network. The appropriate broadcasts messages to the civilian traffic for the purpose of clearing the path of the emergency vehicle.

9 Claims, 5 Drawing Sheets

VEHICLE TO VEHICLE COMMUNICATION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of traffic control systems including arrangements for giving variable traffic instructions. (G08G1/09)

SUMMARY OF INVENTION

The vehicle to vehicle communication system is a traffic control system. The vehicle to vehicle communication system integrates the operation of an emergency vehicle with civilian traffic operating on a road network. The vehicle to vehicle communication system comprises an appropriate authority, a commercially provided and publicly available cellular wireless network, the emergency vehicle, and the civilian traffic. The appropriate authority is defined elsewhere in this disclosure. The appropriate authority exchanges messages with the emergency vehicle using the commercially provided and publicly available cellular wireless network. The appropriate broadcasts messages to the civilian traffic for the purpose of clearing the path of the emergency vehicle.

These together with additional objects, features and advantages of the vehicle to vehicle communication system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle to vehicle communication system in detail, it is to be understood that the vehicle to vehicle communication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle to vehicle communication system.

It is therefore important that the claims be regarded as including such equivalent construction insofar as they do not depart from the spirit and scope of the vehicle to vehicle communication system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
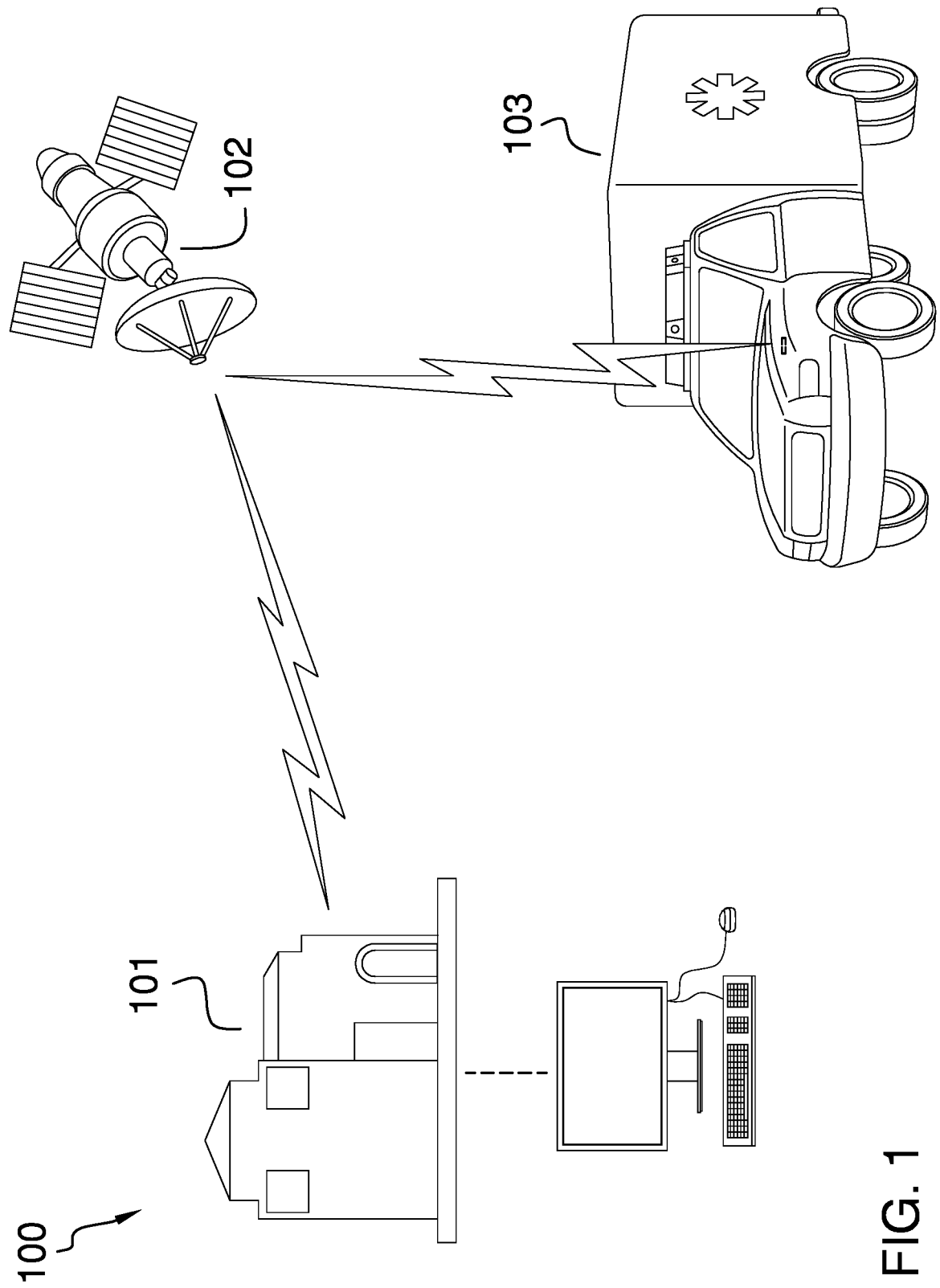
FIG. 1 is a perspective view of an embodiment of the disclosure.
Figure 2:
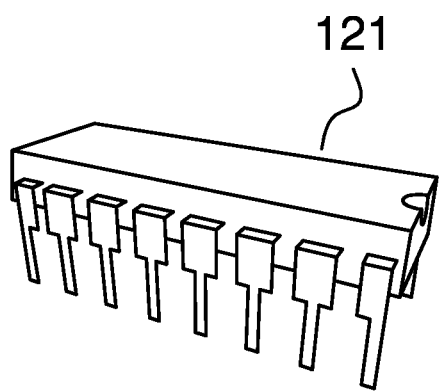
FIG. 2 is a detail view of an embodiment of the disclosure.
Figure 3:
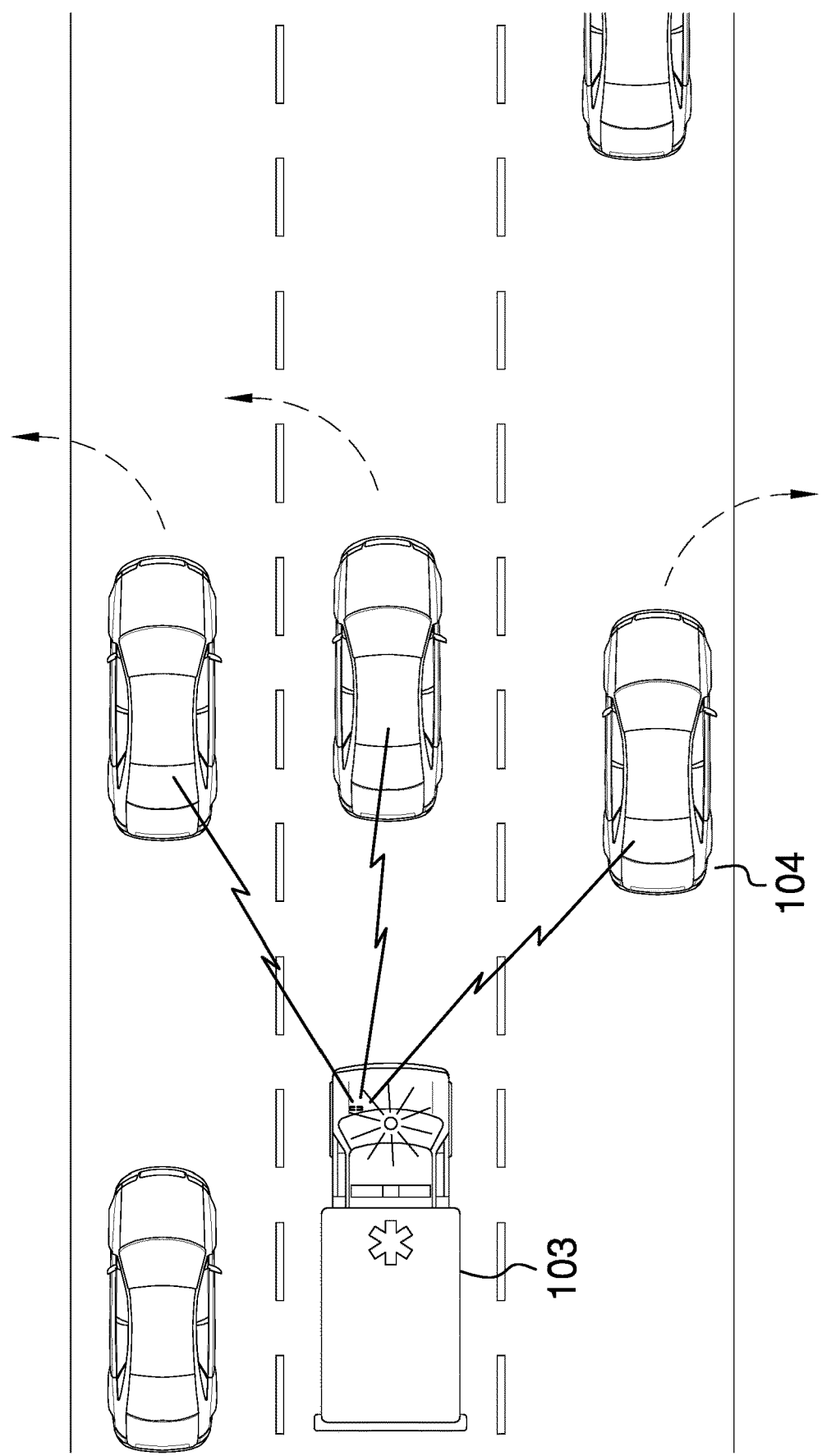
FIG. 3 is an in-use view of an embodiment of the disclosure.
Figure 4:
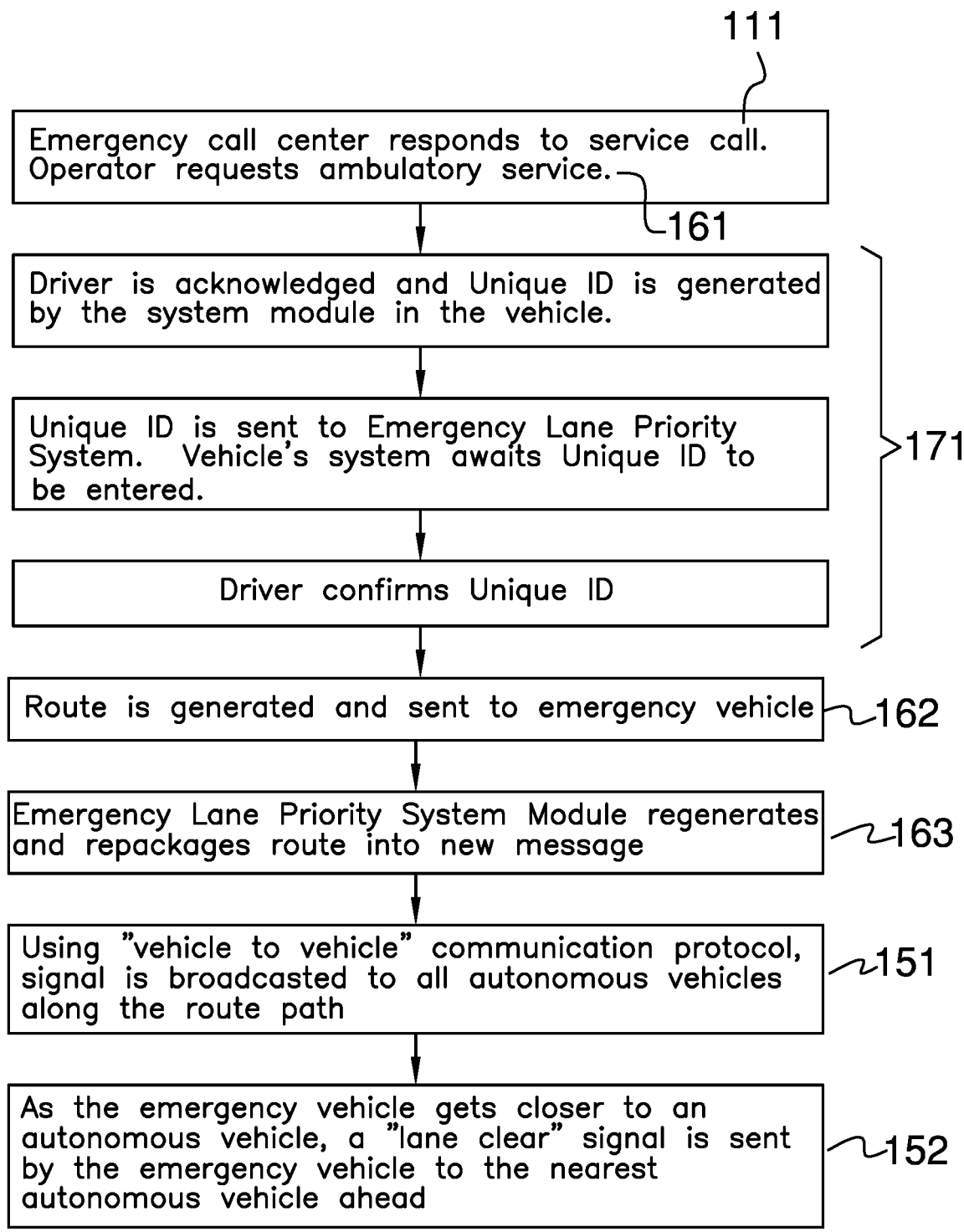
FIG. 4 is a flowchart of an embodiment of the disclosure.
Figure 5:
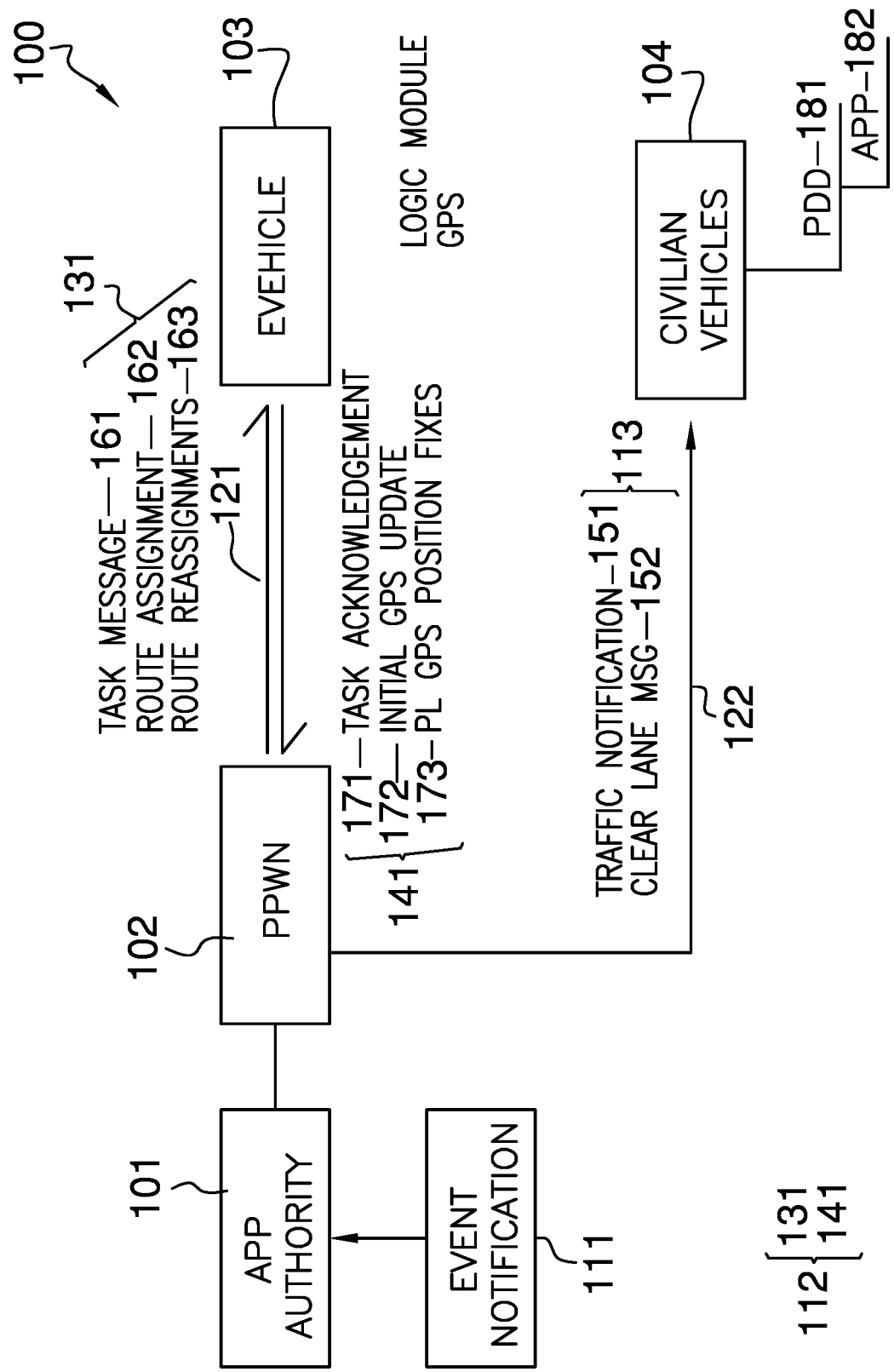
FIG. 5 is a schematic view of an embodiment of the disclosure.

Detailed reference will now be made to one or more potential embodiments of the disclosure, which are illustrated in FIGS. 1 through 5.

The vehicle to vehicle communication system 100 (hereinafter invention) is a traffic control system. The invention 100 integrates the operation of an emergency vehicle 103 with civilian traffic 104 operating on a road network. The invention 100 comprises an appropriate authority 101, a commercially provided and publicly available cellular wireless network 102, the emergency vehicle 103, and the civilian traffic 104. The appropriate authority 101 is defined elsewhere in this disclosure. The appropriate authority 101 exchanges messages with the emergency vehicle 103 using the commercially provided and publicly available cellular wireless network 102. The appropriate broadcasts messages to the civilian traffic 104 for the purpose of clearing the path of the emergency vehicle 103.

The emergency vehicle 103 is a vehicle. The emergency vehicle 103 operates as a privileged vehicle under the traffic regulations of a road network such that the transit time of the emergency vehicle 103 to a time sensitive event is minimized. The emergency vehicle 103 is defined elsewhere in this disclosure.

The emergency vehicle 103 uses a GPS module to determine the location of the emergency vehicle 103. The GPS module is an electrical device that communicates with the GPS to determine the GPS coordinates of the emergency vehicle 103. The emergency vehicle 103 transfers the GPS coordinates of the emergency vehicle 103 to the appropriate authority 101.

The civilian traffic 104 refers to one or more vehicles traveling over the road network. The civilian traffic 104 does not operate with any special authority or privilege under the traffic regulations of the road network. Each vehicle that makes up the civilian traffic 104 further comprises a personal data device 181.

The personal data device 181 is a programmable electrical device. The personal data device 181 further comprises an application 182. The personal data device 181 provides data management and communication services through one or more functions referred to as an application 182. The application 182 is a set of logical operating instructions that are performed by the personal data device 181. This disclosure assumes that an application 182 exists for the purpose of interacting with the invention 100. Methods to design and implement an application 182 on a personal data device 181 are well known and documented in the electrical arts.

The application 182 of the personal data device 181 forms an interface with the commercially provided and publicly available cellular wireless network 102 and a vehicle selected from the civilian traffic 104. The personal data device 181 relays each of the plurality of generated civilian traffic 104 messages 113 broadcast by the appropriate authority 101 over the commercially provided and publicly available cellular wireless network 102 to the vehicle selected from the civilian traffic 104.

The appropriate authority 101 is an organization that is tasked with administering a road network. The appropriate authority 101 is defined elsewhere in this disclosure. The appropriate authority 101 receives an event notification message 111. The appropriate authority 101 generates, transmits, and receives a plurality of emergency vehicle 103 communications 112. The appropriate authority 101 generates and broadcasts a plurality of generated civilian traffic 104 messages 113. The communications of the appropriate authority 101 comprises an event notification message 111, a plurality of emergency vehicle 103 communications 112, and a plurality of generated civilian traffic 104 messages 113.

The event notification message 111 is a message that is received by the appropriate authority 101. The event notification message 111 informs the appropriate authority 101 that a time sensitive event has occurred that requires the operation of the emergency vehicle 103. The event notification message 111 initiates the activation of the procedures described in this disclosure.

Each of the plurality of emergency vehicle 103 communications 112 is a message selected from the group consisting of: a) a message transmitted from the appropriate authority 101 to the emergency vehicle 103; and, b) a message transmitted from the emergency vehicle 103 to the appropriate authority 101. The plurality of emergency vehicle 103 communications 112 further comprises a plurality of generated emergency vehicle 103 messages 131 and a plurality of received emergency vehicle 103 messages 141.

Each of the plurality of generated emergency vehicle 103 messages 131 is a message transmitted from the appropriate authority 101 to the emergency vehicle 103. Each of the plurality of generated emergency vehicle 103 messages 131 contains information that is selected from the group consisting of: a) tasking the emergency vehicle 103 with a time sensitive task; b) providing the emergency vehicle 103 with a route to the location that the emergency vehicle 103 has been tasked to go to; and, c) updating the route to the location the emergency vehicle 103 has been assigned based on changes in the operating environment that are monitored by the appropriate authority 101. The plurality of generated emergency vehicle 103 messages 131 comprises a tasking message 161, a route assignment message 162, and a route reassignment message 163.

The tasking message 161 is a message that is generated by the appropriate authority 101 and transmitted to the emergency vehicle 103. The appropriate authority 101 uses the tasking message 161 to task the emergency vehicle 103 with the responsibility of responding to a time sensitive event. The appropriate authority 101 learns of the time sensitive event through the event notification message 111.

The route assignment message 162 is a message that is generated by the appropriate authority 101 and transmitted to the emergency vehicle 103. The route assignment message 162 provides the emergency vehicle 103 with the course the appropriate authority 101 is planning to clear of civilian traffic 104 for the emergency vehicle 103.

The route reassignment message 163 is a message that is generated by the appropriate authority 101 and transmitted to the emergency vehicle 103. The route reassignment message 163 provides the emergency vehicle 103 with updates and changes to the course the appropriate authority 101 is planning to clear of civilian traffic 104 for the emergency vehicle 103.

Each of the plurality of received emergency vehicle 103 messages 141 is a message transmitted from the emergency vehicle 103 to the appropriate authority 101. Each of the plurality of received emergency vehicle 103 messages 141 contains information that is selected from the group consisting of: a) acknowledging the tasking of the emergency vehicle 103 by the appropriate authority 101; and, b) transmitting to the appropriate authority 101 the GPS coordinates of the emergency vehicle 103. The plurality of received emergency vehicle 103 messages 141 comprises a task acknowledgment message 171, an initial location confirmation message 172, and a plurality of periodic location update messages 173.

The task acknowledgment message 171 is a message that is generated by the emergency vehicle 103 and transmitted to the appropriate authority 101. The task acknowledgment message 171 acknowledges the receipt of the tasking message 161 and confirms that the emergency vehicle 103 can respond to the time sensitive event described in the tasking message 161.

The initial location confirmation message 172 is a message that is generated by the emergency vehicle 103 and transmitted to the appropriate authority 101. The initial location confirmation message 172 transmits the GPS coordinates of the emergency vehicle 103 to the appropriate authority 101 that were current at the time of the receipt of the tasking message 161.

The plurality of periodic location update messages 173 is a message that is generated by the emergency vehicle 103 and transmitted to the appropriate authority 101. The plurality of periodic location update messages 173 transmits the GPS coordinates of the emergency vehicle 103 to the appropriate authority 101 that are current at the time of the transmission of the plurality of periodic location update messages 173.

Each of the plurality of generated civilian traffic 104 messages 113 is an SMS message that is broadcast by the appropriate authority 101 to the civilian traffic 104. The plurality of generated civilian traffic 104 messages 113 comprises a traffic notification message 151 and a clear lanes message 152.

The traffic notification message 151 is a message that is broadcast by the appropriate authority 101 to the civilian traffic 104. The traffic notification message 151 notifies the civilian traffic 104 that an emergency vehicle 103 is operating on the road network in response to a time sensitive situation. The clear lanes message 152 is a message that is broadcast by the appropriate authority 101 to the civilian traffic 104. The clear lanes message 152 instructs the civilian traffic 104 to clear the road network in anticipation of the arrival of the emergency vehicle 103.

The commercially provided and publicly available cellular wireless network 102 is a communication network. The appropriate authority 101 uses the commercially provided and publicly available cellular wireless network 102 to transmit the plurality of emergency vehicle 103 communications 112 to the emergency vehicle 103. The appropriate authority 101 receives the plurality of emergency vehicle 103 communications 112 from the emergency vehicle 103 over the commercially provided and publicly available cellular wireless network 102. The appropriate authority 101 uses the commercially provided and publicly available cellular wireless network 102 to broadcast the plurality of generated civilian traffic 104 messages 113 as SMS messages to the civilian traffic 104. The commercially provided and publicly available cellular wireless network 102 is defined elsewhere in this disclosure.

The commercially provided and publicly available cellular wireless network 102 further comprises an emergency vehicle 103 wireless communication link 121 and a civilian traffic 104 broadcast channel 122.

The commercially provided and publicly available cellular wireless network 102 transmits the plurality of generated emergency vehicle 103 messages 131 to the emergency vehicle 103 over the emergency vehicle 103 wireless communication link 121. The commercially provided and publicly available cellular wireless network 102 receives the plurality of received emergency vehicle 103 messages 141 from the emergency vehicle 103 over the emergency vehicle 103 wireless communication link 121. The emergency vehicle 103 wireless communication link 121 is a wireless communication link that is formed between the commercially provided and publicly available cellular wireless network 102 and the emergency vehicle 103.

The civilian traffic 104 broadcast channel 122 is a wireless communication link that is formed between the appropriate authority 101 and the civilian traffic 104. The commercially provided and publicly available cellular wireless network 102 broadcasts the plurality of generated civilian traffic 104 messages 113 to the civilian traffic 104 over the civilian traffic 104 broadcast channel 122.

The appropriate authority 101 uses a wireless electronic communication device that allows the appropriate authority 101 to wirelessly communicate with the emergency vehicle 103. The appropriate authority 101 exchanges SMS and MMS messages containing the plurality of emergency vehicle 103 communications 112 with the emergency vehicle 103. The appropriate authority 101 transmits SMS and MMS messages containing the plurality of generated emergency vehicle 103 messages 131 to the emergency vehicle 103 through the commercially provided and publicly available cellular wireless network 102. The appropriate authority 101 receives SMS and MMS messages containing the plurality of received emergency vehicle 103 messages 141 from the emergency vehicle 103 through the commercially provided and publicly available cellular wireless network 102.

The use of a commercially provided and publicly available cellular wireless network 102 is preferred because: 1) of its low cost; 2) of the widespread availability and the broad interoperability between competing commercially provided and publicly available cellular wireless networks 102; and, 3) methods and techniques to send SMS and MMS messages over a commercially provided and publicly available cellular wireless network 102 are well known and documented by those skilled in the electrical arts.

The appropriate authority 101 uses a wireless electronic communication device that allows the appropriate authority 101 to wirelessly broadcast the plurality of generated civilian traffic 104 messages 113 to the civilian traffic 104. The appropriate authority 101 broadcasts SMS and MMS messages to the civilian traffic 104 through the commercially provided and publicly available cellular wireless network 102. The use of a commercially provided and publicly available cellular wireless network 102 is preferred because: 1) of its low cost; 2) of the widespread availability and the broad interoperability between competing commercially provided and publicly available cellular wireless networks 102; and, 3) methods and techniques to send SMS and MMS messages over a commercially provided and publicly available cellular wireless network 102 are well known and documented by those skilled in the electrical arts.

The following definitions were used in this disclosure:

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Bluetooth™: As used in this disclosure, Bluetooth™ is a standardized communication protocol that is used to wirelessly interconnect electronic devices.

Broadcast: As used in this disclosure, a broadcast refers to a radio frequency transmission intended to be received by a plurality of receivers.

Civilian: As used in this disclosure, civilian refers to an individual or an organization that not a member of either a military force or a police force. This disclosure extends the definition of civilian to further exclude membership in an emergency response organization such as fire or ambulance services.

Communication Link: As used in this disclosure, a communication link refers to the structured exchange of data between two objects.

Commercially Provided And Publicly Available Cellular Wireless Network: As used in this disclosure, a commercially provided and publicly available cellular wireless network refers to subscription based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Course: As used in this disclosure, a course refers to the direction, and changes to the direction, that are required to travel from a starting point to a destination point.

Emergency Vehicle: As used in this disclosure, an emergency vehicle is a vehicle that is operated on a road network by an appropriate authority. The emergency vehicle is equipped with visible and audible alarms and markings that indicate that the emergency vehicle operates as a privileged vehicle under traffic regulations and that other vehicles operating on the road network are required yield their rights under the traffic regulations to the emergency vehicle.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Multipath Structure: As used in this disclosure, a multipath structure refers to a plurality of path structures that offer a plurality of different routes sharing the same starting point and the same destination point. A road network is considered a multipath structure.

Path: As used in this structure, a path is a marked or identified route along which an individual or object can travel. A path is often formed as a track, a road or a trail.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

PPWN: As used in this disclosure, the PPWN is an acronym for publically provided wireless network. The PPWN refers to a commercially provided and publicly available cellular wireless network.

Route: As used in this disclosure, a route refers to the course that is taken to travel from a starting point to a destination point.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A traffic management system comprising
an appropriate authority, a cellular wireless network, the emergency vehicle, and the civilian traffic;
wherein the appropriate authority exchanges messages with the emergency vehicle using the cellular wireless network;
wherein the appropriate broadcasts messages to the civilian traffic for the purpose of clearing the path of the emergency vehicle;
wherein the traffic management system is a traffic control system;
wherein the traffic management system integrates the operation of an emergency vehicle with civilian traffic operating on a road network;
wherein the emergency vehicle is a vehicle;
wherein the emergency vehicle operates as a privileged vehicle under the traffic regulations of a road network such that the transit time of the emergency vehicle to a time sensitive event is minimized;
wherein the emergency vehicle uses a GPS module to determine the location of the emergency vehicle;
wherein the GPS module is an electrical device that communicates with the GPS to determine the GPS coordinates of the emergency vehicle;
wherein each vehicle that makes up the civilian traffic further comprises a personal data device;
wherein the communications of the appropriate authority comprises an event notification message, a plurality of emergency vehicle communications, and a plurality of generated civilian traffic messages;
wherein the event notification message is a message that is received by the appropriate authority;
wherein each of the plurality of emergency vehicle communications is a message selected from the group consisting of: a) a message transmitted from the appropriate authority to the emergency vehicle; and, b) a message transmitted from the emergency vehicle to the appropriate authority;
wherein each of the plurality of generated civilian traffic messages is an SMS message that is broadcast by the appropriate authority to the civilian traffic;
wherein the personal data device relays each of the plurality of generated civilian traffic messages broadcast by the appropriate authority over the cellular wireless network to the vehicle selected from the civilian traffic;

wherein the event notification message informs the appropriate authority that a time sensitive event has occurred that requires the operation of the emergency vehicle;

wherein the plurality of emergency vehicle communications further comprises a plurality of generated emergency vehicle messages and a plurality of received emergency vehicle messages;

wherein each of the plurality of generated emergency vehicle messages is a message transmitted from the appropriate authority to the emergency vehicle;

wherein each of the plurality of received emergency vehicle messages is a message transmitted from the emergency vehicle to the appropriate authority.

2. The traffic management system according to claim 1
wherein the civilian traffic refers to one or more vehicles traveling over the road network;

wherein the personal data device is a programmable electrical device;

wherein the personal data device further comprises an application;

wherein the application of the personal data device forms an interface with the cellular wireless network and a vehicle selected from the civilian traffic.

3. The traffic management system according to claim 2
wherein the appropriate authority is an organization that is tasked with administering a road network;

wherein the appropriate authority receives an event notification message;

wherein the appropriate authority generates, transmits, and receives a plurality of emergency vehicle communications;

wherein the appropriate authority generates and broadcasts a plurality of generated civilian traffic messages.

4. The traffic management system according to claim 3
wherein each of the plurality of generated emergency vehicle messages contains information that is selected from the group consisting of: a) tasking the emergency vehicle with a time sensitive task; b) providing the emergency vehicle with a route to the location that the emergency vehicle has been tasked to go to; and, c) updating the route to the location the emergency vehicle has been assigned based on changes in the operating environment that are monitored by the appropriate authority;

wherein each of the plurality of received emergency vehicle messages contains information that is selected from the group consisting of: a) acknowledging the tasking of the emergency vehicle by the appropriate authority; and, b) transmitting to the appropriate authority the GPS coordinates of the emergency vehicle.

5. The traffic management system according to claim 4
wherein the plurality of generated emergency vehicle messages comprises a tasking message, a route assignment message, and a route reassignment message;

wherein the tasking message is a message that is generated by the appropriate authority and transmitted to the emergency vehicle;

wherein the appropriate authority uses the tasking message to task the emergency vehicle with the responsibility of responding to a time sensitive event;

wherein the route assignment message is a message that is generated by the appropriate authority and transmitted to the emergency vehicle;

wherein the route assignment message provides the emergency vehicle with the course the appropriate authority is planning to clear of civilian traffic for the emergency vehicle;

wherein the route reassignment message is a message that is generated by the appropriate authority and transmitted to the emergency vehicle;

wherein the route reassignment message provides the emergency vehicle with updates and changes to the course the appropriate authority is planning to clear of civilian traffic for the emergency vehicle.

6. The traffic management system according to claim 5
wherein the plurality of received emergency vehicle messages comprises a task acknowledgment message, an initial location confirmation message, and a plurality of periodic location update messages;

wherein the task acknowledgment message is a message that is generated by the emergency vehicle and transmitted to the appropriate authority;

wherein the task acknowledgement message acknowledges the receipt of the tasking message and confirms that the emergency vehicle can respond to the time sensitive event described in the tasking message;

wherein the initial location confirmation message is a message that is generated by the emergency vehicle and transmitted to the appropriate authority;

wherein the initial location confirmation message transmits the GPS coordinates of the emergency vehicle to the appropriate authority that were current at the time of the receipt of the tasking message;

wherein the plurality of periodic location update messages is a message that is generated by the emergency vehicle and transmitted to the appropriate authority;

wherein the plurality of periodic location update messages transmits the GPS coordinates of the emergency vehicle to the appropriate authority that are current at the time of the transmission of the plurality of periodic location update messages.

7. The traffic management system according to claim 6
wherein the plurality of generated civilian traffic messages comprises a traffic notification message and a clear lanes message;

wherein the traffic notification message is a message that is broadcast by the appropriate authority to the civilian traffic;

wherein the traffic notification message notifies the civilian traffic that an emergency vehicle is operating on the road network in response to a time sensitive situation;

wherein the clear lanes message is a message that is broadcast by the appropriate authority to the civilian traffic;

wherein the clear lanes message instructs the civilian traffic to clear the road network in anticipation of the arrival of the emergency vehicle.

8. The traffic management system according to claim 7
wherein the cellular wireless network is a communication network;

wherein the appropriate authority uses the cellular wireless network to transmit the plurality of emergency vehicle communications to the emergency vehicle;

wherein the appropriate authority receives the plurality of emergency vehicle communications from the emergency vehicle over the cellular wireless network;

wherein the appropriate authority uses the cellular wireless network to broadcast the plurality of generated civilian traffic messages as SMS messages to the civilian traffic.

9. The traffic management system according to claim 8
wherein the cellular wireless network further comprises an emergency vehicle wireless communication link and a civilian traffic broadcast channel;

wherein the emergency vehicle wireless communication link is a wireless communication link that is formed between the cellular wireless network and the emergency vehicle;

wherein the cellular wireless network transmits the plurality of generated emergency vehicle messages to the emergency vehicle over the emergency vehicle wireless communication link;

wherein the cellular wireless network receives the plurality of received emergency vehicle messages from the emergency vehicle over the emergency vehicle wireless communication link;

wherein the civilian traffic broadcast channel is a wireless communication link that is formed between the appropriate authority and the civilian traffic;

wherein the cellular wireless network broadcasts the plurality of generated civilian traffic messages to the civilian traffic over the civilian traffic broadcast channel;

wherein the appropriate authority exchanges SMS messages containing the plurality of emergency vehicle communications with the emergency vehicle;

wherein the appropriate authority transmits SMS messages containing the plurality of generated emergency vehicle messages to the emergency vehicle through the cellular wireless network;

wherein the appropriate authority receives SMS messages containing the plurality of received emergency vehicle messages from the emergency vehicle through the cellular wireless network;

wherein the appropriate authority broadcasts SMS messages to the civilian traffic through the cellular wireless network.

* * * * *